BRACKET TYPE PACKAGE UNIT

Filed Nov. 13, 1953

INVENTOR.
WILLIAM M. OLESON
BY George Lipkin
George E. Pearson
ATTORNEYS

United States Patent Office 2,849,661
Patented Aug. 26, 1958

2,849,661

BRACKET TYPE PACKAGE UNIT

William M. Oleson, San Diego, Calif.

Application November 13, 1953, Serial No. 392,065
3 Claims. (Cl. 317—101)
(Granted under Title 35, U. S. Code (1952), sec. 266)

The invention described herein may be manufactured and used by or for the Government of the United States of America for governmental purposes without the payment of any royalties thereon or therefor.

This invention relates to a repairable plug-in electronics package unit and more particularly to a mounting bracket construction for a package unit which facilitates assembly and permits use of the functional electronic unit with or without an hermetic enclosure.

Many attempts have been made to provide functional units of electronic circuitry to overcome the disadvantages of the conventional construction utilizing tubes in the open and other parts mounted below the chassis, but those units which have provided protection against environmental hazards, such as moisture, dust, abrasion, etc., are difficult to repair particularly those enclosed in sheet metal cans and other such units which may be readily repaired do not provide adequate protection. Encapsulation of electronic circuitry in plastics has provided excellent protection of the components and satisfactory operation, but these units cannot be repaired unless some replaceable components are made accessible and removable.

One repairable electronic package unit is disclosed in the co-pending application of Nye et al., Ser. No. 389,898, filed November 2, 1953, and this invention constitutes an improvement thereover, since the present construction permits complete assembly of the components, tubes, and final wiring to the plug type connector with shorter leads before they are placed in the housing, and the unit may be plugged in without the housing, if desired.

The present invention consists of three basic units similar to those disclosed in the co-pending application of Nye et al., noted supra, that is, the base, the cap, and the parts board. However, a pair of brackets are rigidly mounted on the parts board for supporting the plug type connector and the tube socket or sockets thereon in spaced relation. The components are completely assembled and wired to the terminals on the tube socket and the terminals on the plug before the complete unit is secured in the base member. The cap contains tube wells with retaining springs for shock mounting and shielding of the tubes and both the cap and base member are provided with opposed and aligned vertical slots for positioning and supporting the parts board.

One object of the present invention is to provide an improved electronic plug-in package unit which is easy to assemble and inexpensive to construct.

Another object of the present invention is to provide an improved electronic package unit which permits proper dressing of the leads between the components, tubes, and plug-in connector thus allowing use of higher frequencies and reducing the danger of shorting under higher temperatures.

A further object of the present invention is to provide a repairable plug-in functional package unit which may be completely assembled and is structurally rigid and adequate for use or testing without an enclosure or housing therefor, but may be readily utilized in combination with an hermetically sealed outer housing providing protection from the environmental hazards and adequate shielding between the tubes and components as well as external fields and the effects of radiation interference and microphonics.

Other objects and many of the attendant advantages of this invention will be readily appreciated as the same becomes better understood by reference to the following detailed description when considered in connection with the accompanying drawings wherein.

Figures 1, 2, 3:
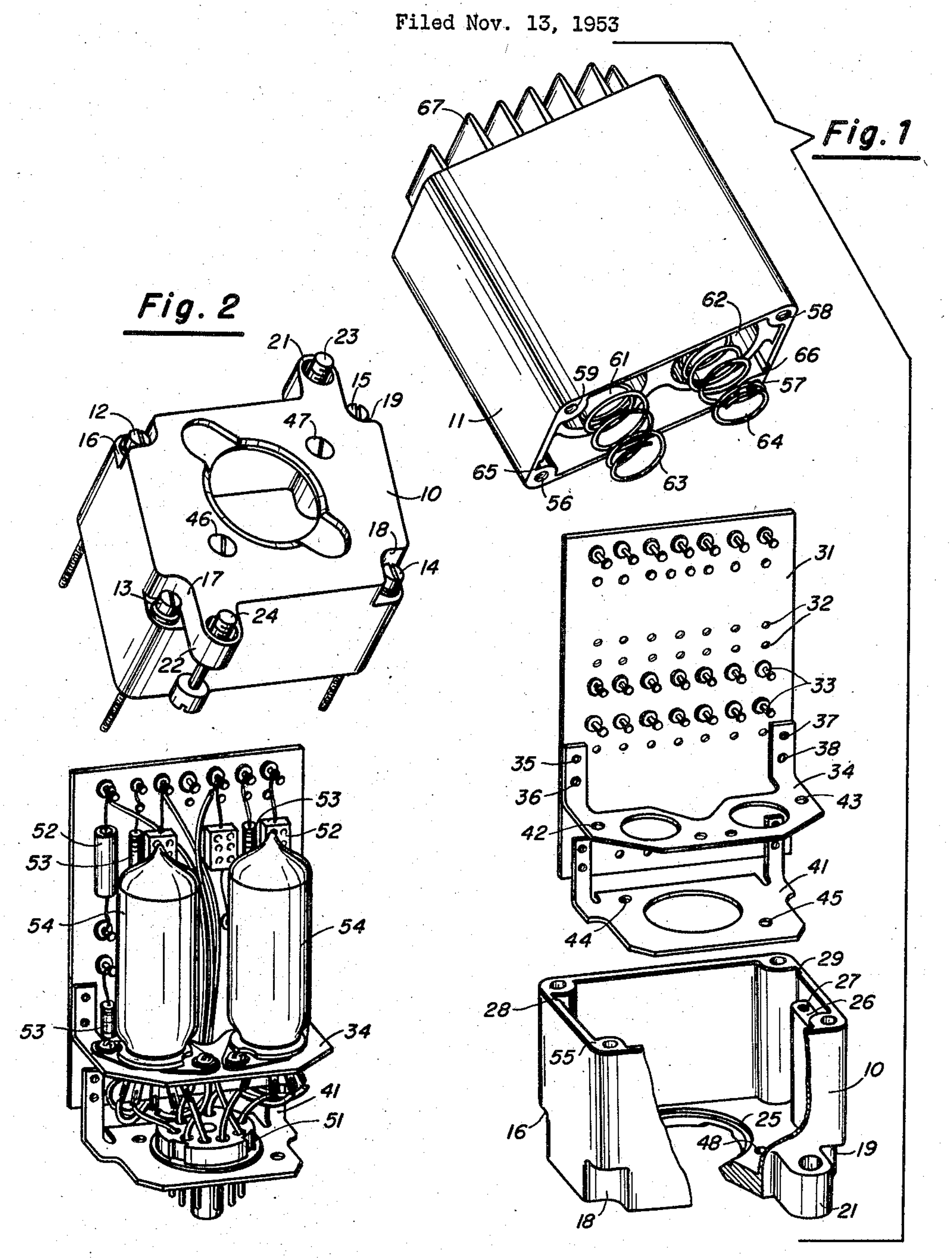
Fig. 1 is an exploded view of the major parts of one preferred embodiment of the present invention.
Fig. 2 is a pictorial view of the base member taken from the bottom.
Fig. 3 is an assembled view of the parts board and brackets with the components, tubes, and plug connector mounted thereon.

Referring now to the drawings in details, one preferred embodiment of the present invention consists of a base member 10 and a cap 11 which are adapted to be secured together with cap screws 12, 13, 14, and 15, the heads of which are seated in corner recesses 16, 17, 18, and 19. The base member 10 is also provided with a pair of lugs 21 and 22, through which extend captive screws 23 and 24 which are adapted to secure the unit in firm intimate contact on a flat surface, such as the mounting chassis.

The base member as illustrated in Fig. 1 is partially broken away to illustrate certain details of the construction and configuration. A circular opening is provided in the bottom of the base member 10 and is surrounded by an annular recess 25 which is adapted to receive a sealing ring (not shown).

The base member 10 is formed with two ledges positioned on opposite sides thereof such as the one indicated at 26 and each is provided with a threaded bore such as the one shown at 27. Also formed in the base member are a pair of oppositely disposed vertical grooves 28 and 29, which serve to guide the parts board 31 and support it in position in the base member 10.

The parts board 31 is preferably formed from a slab of insulating material and is provided with rows of suitable openings such as those indicated at 32 which may, if desired, be indicated by numerals or other indices on both sides and are adapted to receive a plurality of pins such as those indicated at 33.

A bracket 34 is mounted rigidly on the parts board by means of screws 35, 36, 37, and 38. Bracket 34 is mounted in spaced relation above the bottom of the parts board 31 and another bracket 41 so that it rests on the ledge 26 with screws extending through the openings 42 and 43 to engage in threaded bore 27 and another threaded opening (not shown) in the opposite ledge to rigidly secure the bracket 34 in position within the base member 10. Bracket 41 is provided with threaded openings 44 and 45 which are engaged by countersunk screws 46 and 47 indicated in Fig. 2 and extending through the openings such as the one indicated at 48 in the base member 10 in Fig. 1 to retain the parts board assembly rigidly in position in the base member 10 against a sealing ring (not shown) which would be seated in the annular recess 25 and engaged by the bottom of the pin type connector or plug 51 indicated in Fig. 3, wherein the parts board and brackets 34 and 41 are illustrated with the various components such as condensors 52, resistors 53, tubes 54 and the plug 51 mounted and wired thereon.

A sealing gasket such as that indicated at 55 in Fig. 1 is preferably provided for sealing the abutting surfaces between the base member 10 and the cap 11, when they are secured together by cap screws such as 12, 13, 14, and 15 engaging threaded bores 56, 57, 58, and 59 in cap 11.

Cap 11 is provided with integrally formed tube wells 61 and 62 for receiving and shielding tubes 54 and spiral springs 63 and 64 for resiliently engaging the top of tubes 54 to provide a shock mounting therefor. Cap 11 also has formed therein opposite vertical grooves 65 and 66 aligned with grooves 28 and 29 in the base member 10 to guide and position the parts board 31. Cap 11 has cooling fins 67 integrally formed thereon to facilitate dissipation of heat generated within the unit.

It will be apparent that the assembly of the parts board and bracket with the components, tubes and plug as shown in Fig. 3 can be utilized with or without the cap and base member shown in Fig. 1.

Obviously many modifications and variations of the present invention are possible in the light of the above teachings. It is therefore to be understood that within the scope of the appended claims the invention may be practiced otherwise than as specifically described.

What is claimed is:

1. A repairable plug-in package comprising a base member, a cap, ledges formed on opposite sides of said base member, a pair of oppositely disposed aligned vertical slots formed in both said base member and said cap, an aperture in the bottom of said base member, a parts board assembly comprising a parts board positioned in said slots and a pair of spaced brackets secured rigidly to the lower portion of said parts board and extending perpendicularly therefrom, the lower one of said brackets being adapted to mount a connector plug thereon, and means on said parts board adapted for mounting electronics components thereon, means associated with said lower bracket for rigidly mounting and securing said parts board assembly in said base member with said plug extending through the aperture in said base member with said upper bracket supported by said ledges, threaded bores in said ledges, at least one aperture in said upper bracket adapted for mounting a tube socket therein, and smaller openings adjacent said tube socket aperture for securing tube sockets on said bracket, certain of said openings being aligned with the threaded bores in said ledges whereby securing elements may extend therethrough to secure said bracket rigidly in position within said base member.

2. A repairable plug-in electronic package unit comprising a base member, a cap, ledges formed on opposite sides of said base member, a substantially circular aperture in the bottom of said base member, a parts board assembly positioned within both said base member and said cap comprising a parts board and a pair of spaced brackets secured rigidly to the lower portion of said parts board and extending perpendicularly therefrom, the lower one of said brackets being adapted to mount a connector plug thereon, the upper one of said brackets being adapted to mount at least one electronic tube thereon, and means on said parts board adapted for mounting electronics components thereon, means associated with said lower bracket for rigidly mounting and securing said parts board assembly in said base member with said plug extending through the aperture in said base member with said upper bracket supported by said ledges, said cap having at least one tube well formed therein, and resilient means within said tube wells adapted to engage an electronic tube positioned therein to provide a shock mounting therefor.

3. A repairable plug-in electronic package unit comprising a base member, a cap having cooling fins thereon, ledges formed on opposite sides of said base member, a pair of oppositely disposed aligned vertical slots formed in both said base member and said cap, a substantially circular aperture in the bottom of said base member, a parts board assembly positioned in said slots comprising a parts board and a pair of spaced brackets secured rigidly to the lower portion of said parts board and extending perpendicularly therefrom, the lower end of said brackets being adapted to mount a pin type connector plug thereon, and pin means on said parts board adapted for mounting electronics components thereon, said base member having a plurality of openings through the bottom thereof, said lower bracket having a plurality of threaded openings therethrough aligned with the openings of said base member, and countersunk threaded fastening elements adapted to extend through said openings in said base member and engage the threaded openings in said lower bracket for rigidly mounting and securing said parts board assembly in said base member with said plug extending through the aperture in said base member and with said upper bracket supported by said ledges, threaded bores in said ledges, at least one aperture in said upper bracket adapted for mounting a tube socket therein, openings adjacent said tube socket aperture for securing at least one tube socket on said bracket, certain of said openings being aligned with the threaded bores in said ledges whereby securing elements may extend therethrough to secure said bracket rigidly in position within said base member, said cap having at least one tube well integrally formed therein, and a spiral spring within said tube well adapted to engage an electronic tube positioned therein to provide a shock mounting therefor.

References Cited in the file of this patent

UNITED STATES PATENTS

| | | |
|---|---|---|
| 2,628,270 | Himmel | Feb. 10, 1953 |
| 2,637,763 | Palmer | May 5, 1953 |
| 2,668,933 | Shapiro | Feb. 9, 1954 |
| 2,760,058 | Gross | Aug. 21, 1956 |
| 2,764,713 | Alden | Sept. 25, 1956 |